May 29, 1962 W. E. WOODS 3,037,203
ELECTRICAL INFORMATION CONVERSION SYSTEM
Filed March 15, 1955 3 Sheets-Sheet 1
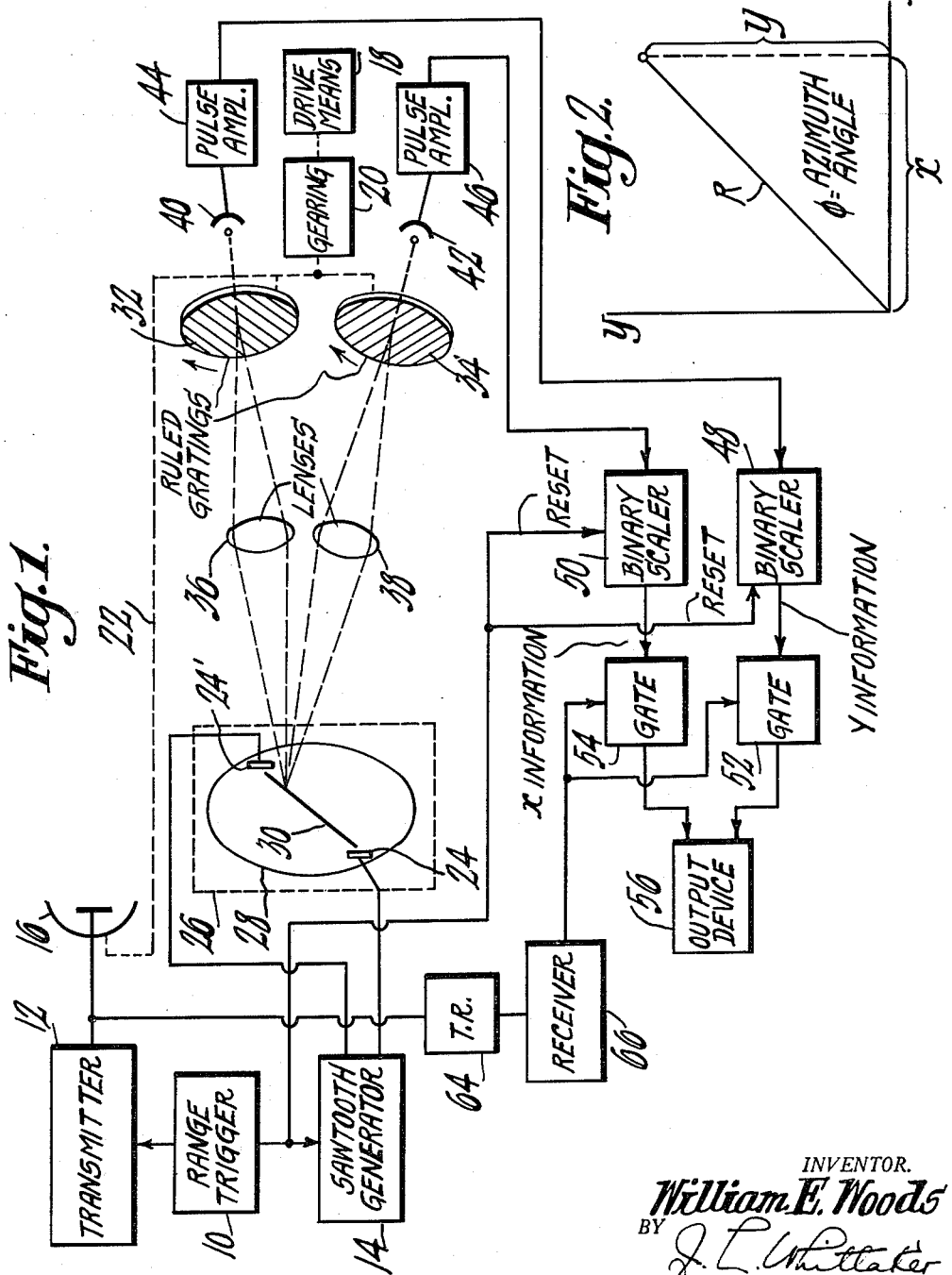
INVENTOR.
William E. Woods
BY
J. L. Whittaker
ATTORNEY May 29, 1962  W. E. WOODS  3,037,203
ELECTRICAL INFORMATION CONVERSION SYSTEM
Filed March 15, 1955  3 Sheets-Sheet 2

R = SLANT RANGE
G = GROUND RANGE
ø = AZIMUTH ANGLE
θ = ELEVATION ANGLE
G = R COS θ
x = G COS ø
  = R COS θ COS ø
y = G SIN ø
  = R COS θ SIN ø
z = R SIN θ

INVENTOR.
William E. Woods
BY
J. L. Whittaker
ATTORNEY

United States Patent Office 3,037,203
Patented May 29, 1962

3,037,203
ELECTRICAL INFORMATION CONVERSION SYSTEM
William E. Woods, Haddonfield, N.J., assignor to Radio Corporation of America, a corporation of Delaware
Filed Mar. 15, 1955, Ser. No. 494,470
16 Claims. (Cl. 343—11)

The present invention relates to an improved system for solving trigonometric problems and in particular to an improved system for instantaneously transposing polar coordinate information into Cartesian coordinate information.

It is is general object of the present invention to provide an improved system for converting two or three dimensional polar coordinate information into rectangular coordinate information.

It is another object of the present invention to provide an improved radar computing system which rapidly transforms the azimuth and/or elevation angle and radar range of a target into the rectangular position coordinates of the target.

It is yet another object of the present invention to provide an improved computing device for transforming polar coordinate information into digital information.

It is still another object of the present invention to provide an improved search radar system providing digitalized output information signals suitable for use in automatic tracking devices and/or other types of computers.

The invention includes means for producing an indication which moves at a predetermined rate. In one form of the invention the means are electronic and include a sawtooth generator periodically deflecting the electron beam of a cathode ray tube indicator to produce an intense moving spot on the screen of the indicator. Means are provided responsive to the moving indication and controlled by the angle coordinate of input polar coordinate in formation for counting at frequencies which are functions of the sine and cosine respectively of said angle. In one form of the invention this includes a first, preferably transparent, ruled grating onto which the moving indication is focused and a second, similar ruled grating onto which the moving spot is focused. The lines on the two ruled gratings are maintained at an angle of 90° with respect to one another and both ruled gratings are simultaneously driven by the means providing the angle coordinate such as, for example, the azimuth drive means of a radar antenna. The outputs of the two gratings consist of light flashes and these are employed to drive respective binary scalers. After an interval of time proportional to the magnitude of the input length coordinate of the input polar information, data is read out of the binary scalers. The counts thus produced are the respective rectangular coordinates of the input polar coordinate location. In a radar system employing the invention, the counts are started in time coincidence with the transmitted radar pulses and stopped in time coincidence with corresponding echoes received from reflecting targets.

The invention is equally applicable to the conversion of three-dimensional polar coordinate data into rectangular positional information. In this form of the invention the polar information my include a length dimension such as slant range and two angle dimensions such as elevation angle and azimuth angle. As in the case of the two-dimensional system means are provided for producing an indication which moves at a predetermined rate such as a cathode ray tube indicator and a sawtooth generator for periodically deflecting the electron beam of the indicator to produce an intense moving spot on the screen of the indicator. The sawtooth wave applied to the indicator is modulated by the cosine of one of the angle coordinates such as the elevation coordinate. Means are provided responsive to the moving indication and controlled by the other angle coordinates such as the azimuth angle coordinate for counting at frequencies which are functions of the sine and cosine, respectively, of said azimuth angle. As in the embodiment previously described, this may include a pair of ruled gratings onto which the moving spot is focused, one grating being at right angles to the other.

The gratings are simultaneously driven by the means providing the azimuth angle coordinates such as the azimuth drive means.

The sawtooth wave is also modulated by a voltage proportional to the sine of the elevation angle coordinates and applied to a second cathode ray tube indicator to deflect its beam. The resulting moving intense spot on the indicator screen is focused onto a third fixed ruled grating.

The outputs of the three ruled gratings consist of light flashes and these are employed to drive three binary scalers. The outputs of the two movable gratings are the respective x and y rectangular coordinates of the input polar coordinate location and the output of the fixed ruled grating is the z rectangular coordinate of the input polar coordinate location. As in the two-dimensional system, when employed in connection with a radar system, the counts are started in time coincidence with transmitted radar pulses and stopped in time coincidence with corresponding echoes received from reflecting targets.

The invention will be described in greater detail by reference to the following description taken in connection with the accompanying drawing in which similar reference characters are applied to similar elements, and wherein:

FIG. 1 is a block diagram of a two-dimensional form of the present invention;

FIG. 2 is a sketch relating to the input and output information of the system;

Figure 3:
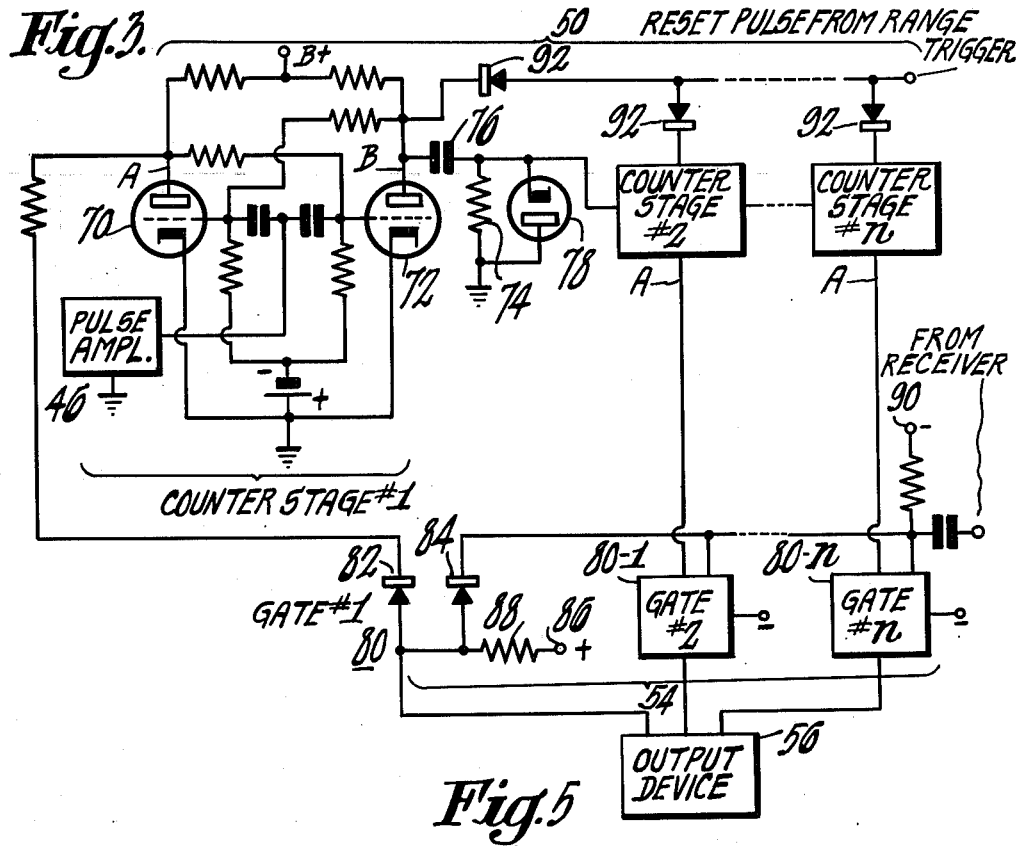
FIG. 3 is a more detailed drawing, partially in block form and partially in schematic form, of a portion of the system of FIG. 1.

Referring now to the drawing and in particular to FIG. 1, a range trigger 10 supplies trigger pulses to both the transmitter 12 and sawtooth generator 14. The transmitter supplies short pulses of radio frequency energy to antenna 16. The antenna is continuously driven in azimuth. The antenna drive means 18 may include a motor which drives the antenna through a set of gears 20 and a mechanical connection 22 shown by dashed lines.

Sawtooth generator 14 supplies its output in push-pull to the horizontal deflection plates 24, 24' of a cathode ray tube indicator shown schematically at 26. In other forms of the invention electromagnetic deflection may be employed instead. The indicator includes an electron gun for producing an electron beam and means for focusing the beam into an intense spot on the screen 28 of the indicator. Since such means are conventional they are not shown in detail in FIG. 1. The output sawtooth wave has a constant slope and periodically deflects the highly focused electron beam across the screen 28 of indicator 26 to provide a display in the form of a single line 30. The sawtooth wave may be blanked during the interval of the return trace by conventional means well known in the art.

The moving spot 30 is focused onto a pair of transparent, circular, rotatable, ruled gratings 32, 34 by an optical system shown schematically as a pair of lenses 36, 38, respectively. Each of the two ruled gratings 32, 34 bears a plurality of parallel lines which are perpendicular to those on the other grating. When the antenna azimuth angle φ is 0°, the lines on x grating 34 are perpendicular to line 30, and those on y grating 32 parallel to line 30. Gearing 20, which drives the antenna 16, simultaneously rotates the gratings from their respective reference positions an angle equal to the antenna angle. However, the 90° displacement between the lines on the respective gratings is maintained constant.

During the operation of the system the "flying spot" focused upon the two ruled gratings is intercepted by the parallel ruled lines of the gratings. These appear at the output of the gratings as light flashes or pulses. The frequency of the light flashes depends upon the slope of the sawtooth voltage wave (which determines the speed of moving spot 30) and on the angle between the parallel ruled lines of the gratings and line 30. The position of the flying spot at any instant is proportional to the slant range, at that instant, of the radar system. (It will be appreciated that in a ground-to-ground search radar slant range is equal to ground range.) At that instant the rectangular coordinates of a target are $x$ and $y$ (see FIG. 2). If R is range, then $x$ and $y$ are the true ground coordinates of the target. If R is slant range, $x$ and $y$ are what is known as slant range coordinates.

The frequency $f_x$ of the light flashes produced by the x grating 34 is:

$$f_x = KR \cos \phi$$

and the frequency $f_y$ of the light flashes produced by the y grating 32 is:

$$f_y = KR \sin \phi$$

where
K=calibration constant
R=maximum range

The light flashes produced by gratings 32 and 34 are focused on a pair of photocells 40, 42. The outputs of the photocells are amplified by pulse amplifiers 44, 46 and applied to binary scalers 48, 50. The circuits of the binary scalers will be described in more detail below. Gate circuits 52, 54 are normally closed and prevent the binary information from being applied to output device 56 which may, for example, be a digital computer such as Dyseac.

In the operation of the system, a high frequency pulse radiated by antenna 16 strikes a target and is reflected back to the antenna as an echo. The echo is applied through transmit-receive device 64 to receiver 66 and thence to gates 52 and 54 respectively. The echo pulse opens gates 52 and 54 and permits the information in binary scalers 48 and 50 to be applied to the output device. The next trigger pulse from range trigger 10 resets the binary scalers.

FIGURE 3 illustrates in greater detail binary scaler 50 and the gate circuits associated therewith. The other binary scaler 52 and its associated circuits are identical. Binary scaler 50 includes a plurality of bistable multivibrators connected in cascade, each said multivibrator constituting one stage of the scaler. The first such stage is illustrated in schematic form and includes a pair of triodes 70, 72. Triode 70 is normally conducting and triode 72 is normally cut-off whereby the potential of plate A is normally relatively low and that of plate B is normally relatively high. An input pulse supplied by pulse amplifier 46 to the respective control grids of tubes 70 and 72 causes the bistable multivibrator circuit to assume its second stable state, that is, it causes tube 70 to be cut-off and tube 72 to be rendered conductive. The output of the first counter stage is taken from plate A. When tube 70 conducts its output may be thought of as zero in the binary code and when it does not conduct its output may be thought of as one in the binary code. The output of plate B of the first bistable multivibrator is differentiated by resistor-condenser circuit 74, 76. When tube 72 changes from its normally non-conducting state to its conducting state a negative pulse is produced and conversely when tube 72 changes from its conducting to its non-conducting state a positive pulse is produced. Diode 78 permits only the positive ones of said pulses to be applied to the second counter stage so that the second bistable multivibrator operates at a frequency one half that of the first bistable multivibrator. Counter stages 2 to $n$ are similar to counter stage 1.

From the above explanation it will be clear that the output of counter stage 1 represents the binary digit of smallest magnitude, the output of counter stage 2 the binary digit of next higher magnitude, and the output of counter stage $n$ the binary digit of greatest magnitude. The count produced by the counter starts in time coincidence with the range trigger.

Gate 54 consists of a plurality of circuits one of which, 80, is shown in detail. It includes a pair of diode 82, 84. According to the convention employed the cathode of each diode is represented by a rectangle and the anode by a triangle. Diode 84 is rendered normally conductive by source of negative potential 90. The negative voltage developed at point C normally biases diode 82 well below cut-off and thus the latter prevents the voltage present on plate A of triode 70 from being applied to the output device 56. However, when an echo pulse is received it is amplified and applied with positive polarity to the cathode of diode 84. This renders the diode 84 non-conductive. Common anode connection point C thereby becomes more positive and diode 82 is placed in condition to conduct. The biasing voltage applied to terminal 86 is such that when diode 84 is rendered non-conductive, and triode 70 is non-conductive (its plate A at a relatively high positive potential), diode 82 permits the voltage present on plate A of triode 70 to be applied to the output device. Gates 80–1 to 80–$n$ are identical to gate 80.

The output device 56 is a digital computer such as "Whirlwind II" or "Dyseac." Since these are well known to those skilled in the art and per se play no part in the present invention, it is believed unnecessary to describe these devices in detail. Details of Dyseac may be found in the following articles in the Proceedings of the I.R.E., Professional Group on Computers: vol. EC3, No. 1, page 1, dated March 1954, titled "System Organization of the Dyseac," and vol. EC3, No. 2, page 8, dated June 1954, titled "System Design of the Dyseac."

The counter stages are reset once each radar pulse repetition interval by a positive pulse from the range trigger 10 (FIG. 1). This pulse is applied via line 90 and diodes 92 to the respective plates of the normally non-conducting tubes of the counter stages.

Figure 4:
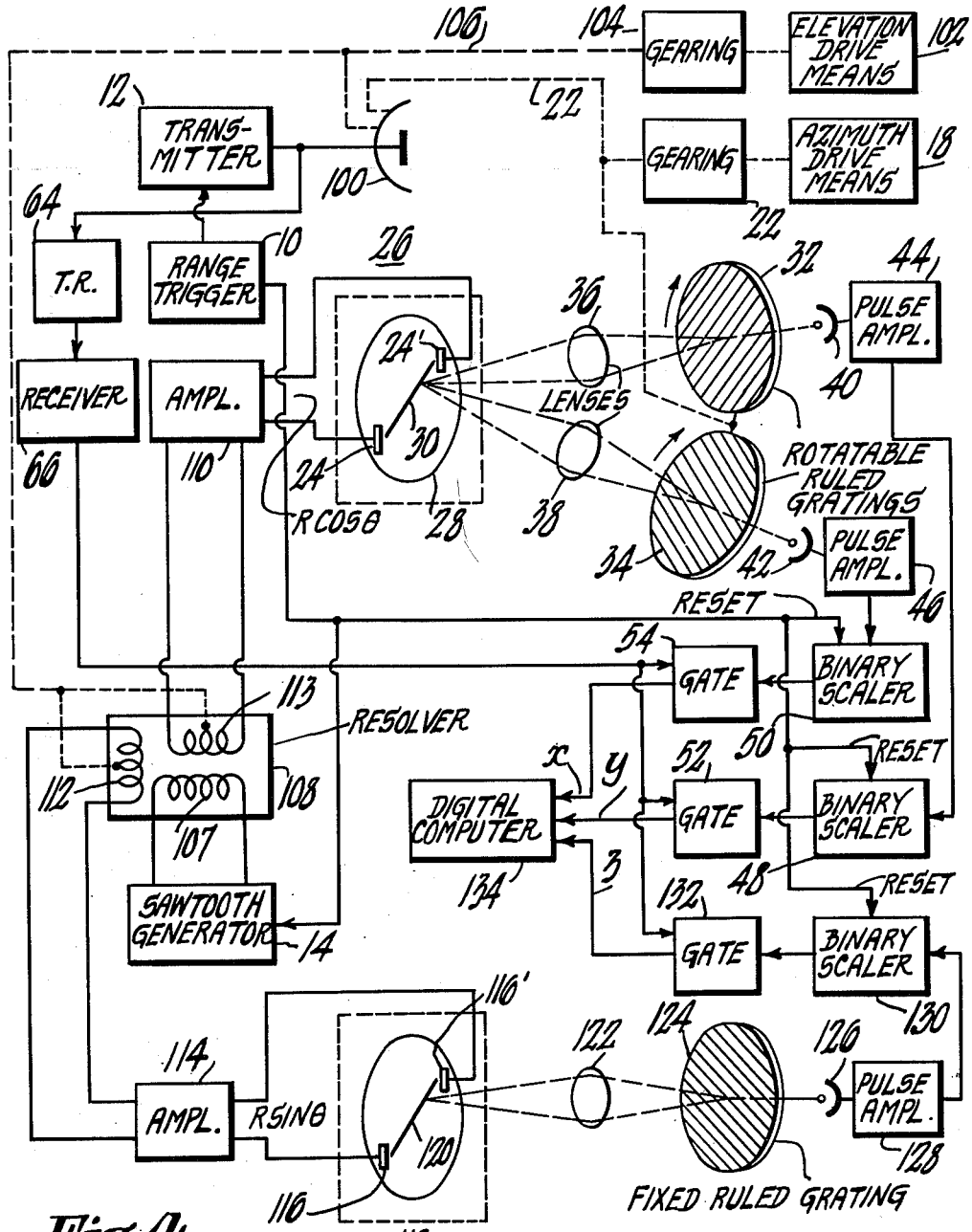
FIG. 4 is a block diagram of a three-dimensional embodiment of the present invention.

FIGURE 4 illustrates the invention as applied to a three-dimensional radar system. Blocks in FIGURE 4 analogous to blocks in FIGURE 1 bear the same reference numerals. The radar system is of a well-known type and includes a directive antenna 100 slowly rotatable in azimuth and rapidly oscillatable in elevation. The latter type of motion is usually termed "nodding." As in the embodiment of FIG. 1, the azimuth drive means 18 of the antenna may include a motor and gearing 20 mechanically connected to the antenna by a shaft 22 indicated as a dashed line. The elevation drive means 102 may also be a motor and it may be fixedly mounted with respect to antenna 100 so that it rotates with the antenna. As in the case of azimuth drive means, gearing 104 is ordinarily employed between the motor and the antenna and the gearing is coupled to the antenna by means of a shaft 106. Alternatively, the elevation drive means may be purely electrical and may vary the beam position in the elevation plane by changing the electrical symmetry of the radiating means.

In operation, transmitter 12 applies short pulses of radio frequency energy to the antenna 100 in response to triggering pulses from range trigger 10. The range trigger also triggers sawtooth generator 14 which produces a sawtooth wave in synchronism with the transmitted pulses. The sawtooth wave is applied to the fixed coil 107 of resolver 108. The rotatable coils 112, 113 of the resolver are driven by mechanical connection 106 and one (coil 113)

provides an output signal proportional to the cosine of elevation angle θ. This output signal is amplified by amplifier 110 and applied in push-pull to the horizontal deflection means 24, 24′ of cathode ray tube indicator 26. The cathode ray tube indicator is identical to the one previously described and the sawtooth wave applied to its deflection plates cause the focused beam to produce an intense moving spot 30 on the indicator screen.

The other movable coil 112 of the resolver 108 produces an output proportional to the sine of the elevation angle. This output is amplified by amplifier 114 and applied to the horizontal deflection means 116, 116′ of a second cathode ray tube indicator 118. This cathode ray tube indicator may be identical to indicator 26, whereby the sawtooth voltage applied to its deflection means produces an intense moving spot 120 on the indicator screen.

Figure 5:
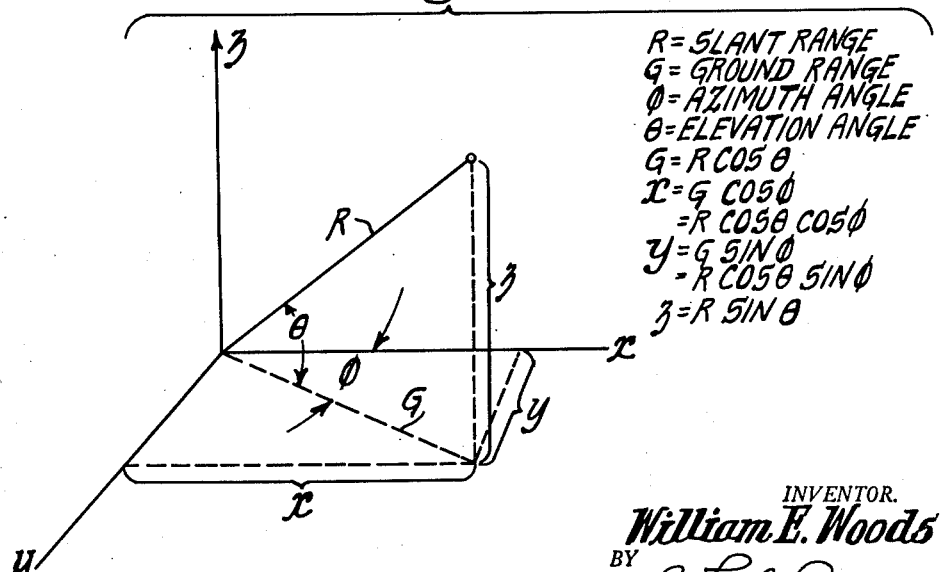
FIG. 5 is a sketch relating to the system shown in FIG. 4.

A brief reference here to FIGURE 5 will aid the reader in understanding the steps described in the immediately preceding paragraph. The radar system shown in FIGURE 4 supplies three-dimensional information consisting of slant range R, azimuth angle $\phi$, and elevation angle $\theta$. It can be seen from FIGURE 5 that the ground range $G = R \cos \theta$. It can also be seen that the three rectangular coordinates x, y, and z corresponding to polar coordinates R, $\theta$, and $\phi$ may be defined as follows:

$x = G \cos \phi = R \cos \theta \cos \phi$
$y = G \sin \phi = R \cos \theta \sin \phi$
$z = R \sin \theta$ The sawtooth wave output of sawtooth generator 14 starts in time coincidence with the transmitted pulse. The phase of the wave at any instant is proportional to the slant range R of the radar system at that instant. In other words, the time interval between a transmitted pulse and a received echo is equivalent to the slant range R of the target reflecting the echo. The output of amplifier 110 is equal to $R \cos \theta$ which from the foregoing equations will be seen to be proportional to G the ground range of the target. Similarly, the output of amplifier 114 is equal to $R \sin \theta$ which it will be seen is proportional to the altitude z of the target.

Referring again to FIG. 4, it can be seen that when moving spot 120 is focused by lens 122 onto a fixed ruled grating 124, the lines of which are perpendicular to the direction of moving spot 120, the resultant light flashes produced will be proportional to z, the rectangular altitude coordinate of the target. These light flashes are received by photocell 126 and applied through pulse amplifier 128 to a binary scaler 130. The output of the binary scaler is applied through a gate 132 to digital computer 134. Binary scaler 130 and gate 132 are identical to the analogous components shown in detail in FIGURE 3.

Referring now to the upper center portion of FIGURE 4, it will be seen that moving spot 30 now moves at a rate proportional to $R \cos \phi$ which, it will be remembered, is the ground range G of the target. Lenses 36 and 38, gratings 32, 34 and the following amplifier, binary scaler, and gate stages are identical to the like numbered elements shown in FIGURE 1. Now, however, moving spot 30 moves at a rate proportional to ground range rather than slant range. The rotatable ruled gratings 32 and 34, respectively, are rotated to provide outputs proportional to the sine and cosine of the azimuth angle respectively. The resultant light flashes applied to photocells 40 and 42, therefore, are proportional to $R \cos \theta \sin \phi$ and $R \cos \theta \cos \phi$, the respective true ground y and x coordinates of a target.

The systems described above require an auxiliary device to show the geographical azimuthal quadrant in which a target is located since they supply information in absolute magnitudes only. Such a device may be quite simple as, for example, a dial indicator arranged to be driven by the azimuth drive means of the radar antenna.

Although in the disclosure above certain specific circuits are illustrated for the counters, gates, cathode ray tube indicators, and the like, it is to be understood that these are merely illustrative and not meant to be limiting. Other well-known binary counters may be employed instead of the one specifically shown. Other well-known gate circuits such as tetrodes may be employed instead of the diodes. The indicators may be electro-magnetic rather than electrostatic. Moreover, mechanical or electromechanical indicators may be substituted for the cathode ray indicator in forms of the invention where a substantially lower rate of moving indication 30 may be tolerated, as, for example, in sound detection apparatuses. The system, although described in connection with two- and three-dimensional radars and particularly applicable to systems for automatically tracking a plurality of targets, is applicable to any system wherein it is desired to transform input polar information into digital rectangular information.

What is claimed is:

1. A system for converting polar-coordinate information including an angle coordinate and a length coordinate into Cartesian-coordinate information comprising, in combination, screen means; means for producing an indication on said screen means which moves at a predetermined rate; first means responsive to said moving indication and controlled by said angle coordinate for counting at a frequency which is a function of the sine of said angle multiplied by said rate; second means responsive to said moving indication and controlled by said angle coordinate for counting at a frequency which is a function of the cosine of said angle multiplied by said rate; and means responsive to the magnitude of said length coordinate coupled to said first and second means for measuring the count produced by said first means and said second means during an interval of time proportional to the magnitude of said length coordinate.

2. A system as set forth in claim 1, wherein said screen means is the screen of a cathode ray tube indicator and said means for producing an indication on said screen means includes means coupled to said cathode ray tube indicator for producing a sharply focused beam of electrons; a sawtooth generator; and cathode ray tube beam deflecting means coupled to said sawtooth generator for deflecting said beam across said screen.

3. A system as set forth in claim 2, wherein said first means includes a member having ruled thereon a plurality of parallel lines spaced the same amounts from one another; a second member similar to said first member but arranged with lines thereon perpendicular to the lines on said first member; means for focusing said moving indication on said cathode ray tube screen onto said two members, whereby said first member produces a plurality of pulses having a frequency which is a function of the sine of the angle of displacement of said first and second members from a reference orientation and said second member produces a plurality of pulses having a frequency which is a function of the cosine of said angle of displacement; and means responsive to said angle for simultaneously rotating said first and second members while maintaining the lines on said members at right angles to one another.

4. A system as set forth in claim 3, wherein said length coordinate comprises an interval of time which is equivalent to distance, and further including means coupled to said sawtooth generator for initiating each sawtooth wave at the beginning of said interval of time, whereby said moving indication starts at the beginning of said interval of time; and wherein said means for measuring said count includes first binary scaler means for counting the pulses produced by said first member and second binary scaler means for counting the pulses produced by said second member; and further including means coupled to said two binary scalers for deriving outputs therefrom after an interval of time equal to said given interval of time.

5. A system for converting three-dimensional polar information consisting of a length coordinate, a first angle coordinate, and a second angle coordinate into three-dimensional rectangular coordinate information comprising, in combination, screen means, first means for producing a first indication on said screen means which moves at a predetermined rate; second means for producing a second indication on said screen means which moves at a predetermined rate; means coupled to said first means for modifying the rate of movement of said first indication in accordance with the cosine of said first angle; means coupled to said second means for modifying the rate of movement of its indication in accordance with the sine of said first angle; first counting means responsive to said modified first moving indication and controlled by said second angle coordinate for counting at a frequency which is a function of the sine of said second angle multiplied by said modified rate; second counting means responsive to said first modified moving indication and controlled by said second angle coordinate for counting at a frequency which is a function of the cosine of said second angle multiplied by said modified rate; third counting means responsive to said second modified moving indication for counting at a frequency which is a function of the modified rate of movement of said second moving indication; and means responsive to the magnitude of said length coordinate coupled to said first, second, and third counting means for measuring the count produced by said three counting means during an interval of time proportional to the magnitude of said length coordinate.

6. A system for converting three-dimensional polar information consisting of a length coordinate, a first angle coordinate, and a second angle coordinate, into three-dimensional rectangular coordinate information comprising, in combination, first indicating means including a screen, and means for producing a first indication on said screen which moves at a predetermined rate; second indicating means including a second screen, and means for producing a second indication on said second screen which moves at a predetermined rate; means coupled to said first means for modifying the rate of movement of said first indication in accordance with the cosine of said first angle; means coupled to said second means for modifying the rate of movement of its indication in accordance with the sine of said first angle; first counting means responsive to said modified first moving indication and controlled by said second angle coordinate for counting at a frequency which is a function of the sine of said second angle multiplied by said modified rate; second counting means responsive to said first modified moving indication and controlled by said second angle coordinate for counting at a frequency which is a function of the cosine of said second angle multiplied by said modified rate; third counting means responsive to said second modified moving indication for counting at a frequency which is a function of the modified rate of movement of said second moving indication; and means responsive to the magnitude of said length coordinate coupled to said first, second, and third counting means for measuring the count produced by said three counting means during an interval of time proportional to the magnitude of said length coordinate.

7. A system as set forth in claim 6, wherein said first and second indicating means comprise first and second cathode ray tube indicator means; means coupled to said two indicator means for producing sharply focused beams of electrons on the respective screens thereof; a sawtooth generator coupled to said cathode ray tube indicators; a cathode ray tube beam deflecting means for each indicator, each said beam deflecting means being coupled to said sawtooth generator for deflecting the beam of its indicator across the screen of its indicator; and said modifying means including means for modulating the sawtooth wave applied to said first cathode ray tube indicator in accordance with the cosine of said first angle; and means for modulating the sawtooth wave applied to said second cathode ray tube indicator in accordance with the sine of said first angle.

8. A system as set forth in claim 7, wherein said first counting means includes a member having ruled thereon a plurality of parallel lines spaced the same amounts from one another; said second counting means includes a member similar to said first member but arranged with the lines thereon perpendicular to the lines of said first member; means for focusing said moving indication on said second cathode ray tube screen onto said two members whereby said first member produces a plurality of pulses having a frequency which is a function of the sine of the angle of displacement of said first member from a reference orientation and said second member produces a plurality of pulses having a frequency which is a function of the cosine of the angle of displacement of said second member from a reference orientation; means responsive to said second angle for simultaneously rotating said first and second members with respect to their reference orientations while maintaining the lines on said members at right angles to one another; and said third counting means includes a third member having ruled thereon a plurality of parallel lines spaced the same amounts from one another, said third member being fixed with respect to said first cathode ray tube indicator with the lines thereon perpendicular to the direction of the moving indication on said first cathode ray tube indicator screen; and means for focusing said first moving indication onto said third member.

9. In an angle-range radar system including means for periodically transmitting pulses to targets and receiving echoes reflected from said targets and means providing information as to the distances of said targets and their angles with respect to a reference line in a given plane, a system for converting said distance and angle information into rectangular coordinate information comprising, in combination, a screen; means for producing an indication on said screen which moves at a predetermined rate; first means responsive to said moving indication and controlled by said angle information for counting at a frequency which is a function of the sine of said angle multiplied by said rate; second means responsive to said moving indication and controlled by said angle information for counting at a frequency which is a function of the cosine of said angle multiplied by said rate; means responsive to the pulses transmitted to said targets for starting said counts in time coincidence with said transmitted pulses; and means responsive to echo pulses received from said targets for stopping said counts in time coincidence with said received echo pulses.

10. In an angle-range radar system including means for periodically transmitting pulses to targets and receiving echoes reflected from said targets and means providing information as to the distance of at least one of said targets and its angle with respect to a reference line in a given plane, a system for converting said distance and angle information into rectangular coordinate information comprising, display means; in combination, means for producing an indication on said display means which moves at a predetermined rate; first means responsive to said moving indication and controlled by said angle information for counting at a frequency which is a function of the sine of said angle multiplied by said rate; second means responsive to said moving indication and controlled by said angle information for counting at a frequency which is a function of the cosine of said angle multiplied by said rate; means responsive to the pulse transmitted to said one target for starting said counts in time coincidence with said transmitted pulse; and means responsive to an echo pulse received from said one target for stopping said counts in time coincidence with said received echo pulse.

11. In a radar system including means transmitting pulses to targets and receiving echoes reflected therefrom, and means supplying information as to the time intervals between pulses transmitted to said targets and echoes received from said targets, and the angles in a given plane of said targets, a system for converting said time interval and angle information into digital rectangular coordinate information indicative of the positions of said targets comprising, in combination, a sawtooth generator operative in synchronism with said transmitted pulses; a cathode ray tube indicator including means for producing a sharply focused beam of electrons on the screen thereof, and deflection means coupled to said sawtooth generator for deflecting said focused beam across said screen to produce a moving indication thereon; a first transparent ruled grating; a second transparent ruled grating disposed with the lines thereof perpendicular to the lines on said first ruled grating; optical means for focusing the moving indication on the screen of said cathode ray tube indicator onto said two ruled gratings; means responsive to said angle information for simultaneously rotating said first and second gratings through said angle while maintaining the lines on said gratings at said right angle to one another, whereby the output of one of said ruled gratings consists of a plurality of pulses having a frequency proportional to the cosine of said angle and the output of the other of said gratings consists of a plurality of pulses having a frequency proportional of the sine of said angle; and an output device receptive of said respective pluralities of pulses for counting the numbers of said pulses produced during each said time interval.

12. In a system as set forth in claim 11, said output device comprising digital computer means.

13. In a system as set forth in claim 11, said angles comprising the azimuth angles of said targets and said radar further supplying information as to the elevation angles of said targets, further including means responsive to said elevation angle and coupled to said sawtooth generator means for modulating the sawtooth output thereof in accordance with the cosine of said elevation angle, whereby said ruled gratings supply counts indicative of the ground range rectangular coordinates of said targets.

14. In a system as set forth in claim 13, further including means responsive to the sine of said elevation angle for producing a count indicative of the altitude rectangular coordinates of said targets.

15. In a system as set forth in claim 14, said last-named means including second cathode ray tube indicator means for producing a focused electron beam on the screen thereof; means responsive to said elevation angle for modulating said sawtooth wave in accordance with the sine thereof; means for deflecting the electron beam of said cathode ray tube indicator across the screen of said indicator in accordance with said sinusoidally modulated sawtooth wave; a third transparent ruled grating positioned with its lines perpendicular to the moving indication on the screen of said second cathode ray tube indicator; means for focusing said last-named moving indication onto said ruled grating; and means for counting the number of output pulses produced by said third ruled grating during each said time interval.

16. A system for converting polar coordinate information including a length coordinate and an angle coordinate into cartesian coordinates comprising, in combination, means for moving a visible mark along a path at a predetermined rate; first means responsive to said moving visible mark and controlled by said angle coordinate for counting at a frequency which is a function of the sine of said angle multiplied by said rate; second means responsive to said moving visible mark and controlled by said angle coordinate for counting at a frequency which is a function of the cosine of said angle multiplied by said rate; and means responsive to the magnitude of said length coordinate coupled to said first and second means for measuring the count produced by said first means and said second means during an interval of time proportional to the magnitude of said length coordinate.

No references cited.

UNITED STATES PATENT OFFICE

CERTIFICATE OF CORRECTION

Patent No. 3,037,203

May 29, 1962

William E. Woods

It is hereby certified that error appears in the above numbered patent requiring correction and that the said Letters Patent should read as corrected below.

Column 1, line 14, for "is", second occurrence, read -- a --; line 38, for "in formation" read -- information --; column 2, line 13, for "coordinates" read -- coordinate --; column 4, line 13, for "diode" read -- diodes --; column 8, line 56, for "display means; in combination," read -- in combination, display means; --.

Signed and sealed this 9th day of October 1962.

(SEAL)
Attest:

ERNEST W. SWIDER
Attesting Officer

DAVID L. LADD
Commissioner of Patents